(12) United States Patent
Müller et al.

(10) Patent No.: US 6,814,346 B2
(45) Date of Patent: Nov. 9, 2004

(54) SHOCK ABSORBER

(75) Inventors: Michael Müller, Hennef (DE); Jörg Brandhofer, Eitorf-Obereip (DE)

(73) Assignee: ZF Sachs AG, Eitorf (DE)

( * ) Notice: Subject to any disclaimer, the term of this patent is extended or adjusted under 35 U.S.C. 154(b) by 0 days.

(21) Appl. No.: 10/369,934

(22) Filed: Feb. 19, 2003

(65) Prior Publication Data

US 2003/0155198 A1 Aug. 21, 2003

(30) Foreign Application Priority Data

Feb. 20, 2002 (DE) .......................................... 102 07 102

(51) Int. Cl.[7] ................................................ F16F 9/04
(52) U.S. Cl. .................. 267/64.21; 267/64.24
(58) Field of Search .......................... 267/64.11, 64.15, 267/64.19, 64.21, 64.23, 64.24, 64.26, 64.27; 188/322.16, 322.19; 280/124.1, 124.157, 124.158

(56) References Cited

U.S. PATENT DOCUMENTS

| | | | | |
|---|---|---|---|---|
| 4,712,776 A | * | 12/1987 | Geno et al. .............. | 267/64.21 |
| 5,636,831 A | * | 6/1997 | Gubitz .................... | 267/64.24 |
| 5,667,203 A | * | 9/1997 | Romer .................... | 267/64.23 |
| 5,669,597 A | * | 9/1997 | Rittstieg et al. ......... | 267/64.17 |
| 6,402,128 B1 | * | 6/2002 | Trowbridge .............. | 267/64.21 |

* cited by examiner

Primary Examiner—Robert A. Siconolfi
Assistant Examiner—Melanie Torres
(74) Attorney, Agent, or Firm—Cohen, Pontani, Lieberman & Pavane

(57) ABSTRACT

A damping element has a container tube which is connected to a rolling tube of an air spring, the rolling tube being connected via a spring bellows acting as a rolling bellows to an outer tube which is arranged concentrically and such that it can move axially with respect to the rolling tube, the spring bellows and the rolling tube bounding a gas chamber provided with a gas filling under pressure. The rolling tube is sealed off with respect to the container tube by an O ring in a groove in the container tube, while, at another point on the container tube, projections are arranged as a stop for a front end of the rolling tube in order to dissipate the axial component of the gas pressure acting on said rolling tube. The assembly of the rolling tube on the container tube and the associated sealing by means of the O ring are achieved simply in a cost-effective manner by pushing the tubes together, the position of the tubes in relation to each other resulting automatically as a result of the projections.

6 Claims, 1 Drawing Sheet

SHOCK ABSORBER

BACKGROUND OF THE INVENTION

1. Field of the Invention

The invention relates to a shock absorber, comprising a damping element and an air spring, the damping element having a container tube which is connected to a rolling tube of the air spring, the rolling tube being connected via a spring bellows acting as a rolling bellows to an outer tube which is arranged concentrically and such that it can move axially with respect to the rolling tube, the spring bellows and the rolling tube bounding a gas chamber provided with a gas filling under pressure.

2. Description of the Related Art

Shock absorbers of the aforementioned type are used, for example, on a suspension of a driver's cab on a chassis of a utility vehicle, in order to keep the oscillations introduced into the chassis by the road via the wheel suspensions largely away from the driver's cab. In this case, the outer tube of the air spring and a piston rod of the damping element are connected to the driver's cab, and the damping element is connected to the chassis via a fixing component. The action of the air spring depends on the size and the pressure prevailing in the gas chamber, the distance of the outer tube from the rolling tube, and the shape of the rolling profile on the rolling tube.

The solution to the problem of sealing the gas chamber with respect to the atmosphere, by using a O ring between the rolling tube of the air spring and the container tube of the damping element, belongs to the prior art. In order to dissipate the axial component of the gas pressure, acting as a result of the high prestress in the gas chamber, onto the container tube, a design has hitherto been chosen which provides an adapter ring, which can be produced only with high expenditure on production and has to be welded to the container tube. Furthermore, the O ring is arranged in the adapter ring or in the vicinity thereof, which makes the design complicated and more expensive. One contour of the rolling tube is supported axially on the adapter ring, which intercepts the axial forces from the air spring and dissipates them into the container tube. However, the higher the numbers are, the greater becomes the demand for rationalization of the aforementioned support and sealing of the rolling tube on the container tube.

In order to support the rolling tube axially on the container tube and to seal off the rolling tube with respect to the container tube, the present invention proposes dispensing with the costly adapter ring and separating the two functions "support" and "sealing" physically from each other and replacing them by devices known per se. Since the gas chamber of the air spring is under continuous pressure, it is merely necessary to secure the rolling tube axially with respect to the container tube of the damping element in the direction pointing away from the air spring. For this purpose, the container tube can be provided with integral moldings which the rolling tube strikes with a constriction or with its front end. The integral moldings are preferably indentations having a lug and possibly also a contact shoulder, against which the rolling tube is pressed by the pressure in the air spring. When the shock absorber is installed, the result is therefore a stable positional state for the rolling tube with respect to the container tube of the damping element, as a result of the pressure prevailing continuously in the air spring. Instead of the integral moldings on the container tube, however, there may also be a groove, into which the end of the rolling tube is rolled. Finally, it is also possible nowadays to make an adhesively bonded connection, with or without form-fitting surface configurations on the two tubes.

SUMMARY OF THE INVENTION

According to the proposal of the invention, the sealing of the rolling tube with respect to the container tube is performed by an O ring, whose position is determined by a groove in the container tube. This groove is rolled into the container tube and therefore has rounded edges and a surface with low roughness, which are imperative for tightness over the entire lifetime of the sealing element. In the case where the contact shoulder is provided, it is expedient to widen the end region of the rolling tube at the front end slightly conically, corresponding to the shape of the contact shoulder. This makes it easier to mount the rolling tube over the O ring in its groove in the container tube with a low faulty assembly rate in large-scale mass production, since the O ring does not come into contact with the inner edge of the front end.

The present invention has therefore taken as its object the provision of a shock absorber, comprising a damping element and an air spring, in which a rolling tube, as a constituent part of the air spring, can be fixed axially and sealed with respect to a container tube of the damping element in a cost-effective way and with little expenditure on assembly.

According to the invention, the container tube is sealed off with respect to the rolling tube by an O ring. At another point on the container tube, a stop for the rolling tube is arranged in order to dissipate the axial component of the gas pressure acting on the rolling tube.

An exemplary embodiment of an axial fixing with sealing of a rolling tube of an air spring with respect to a container tube of a damping element will be explained by using a drawing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figures 1, 2:
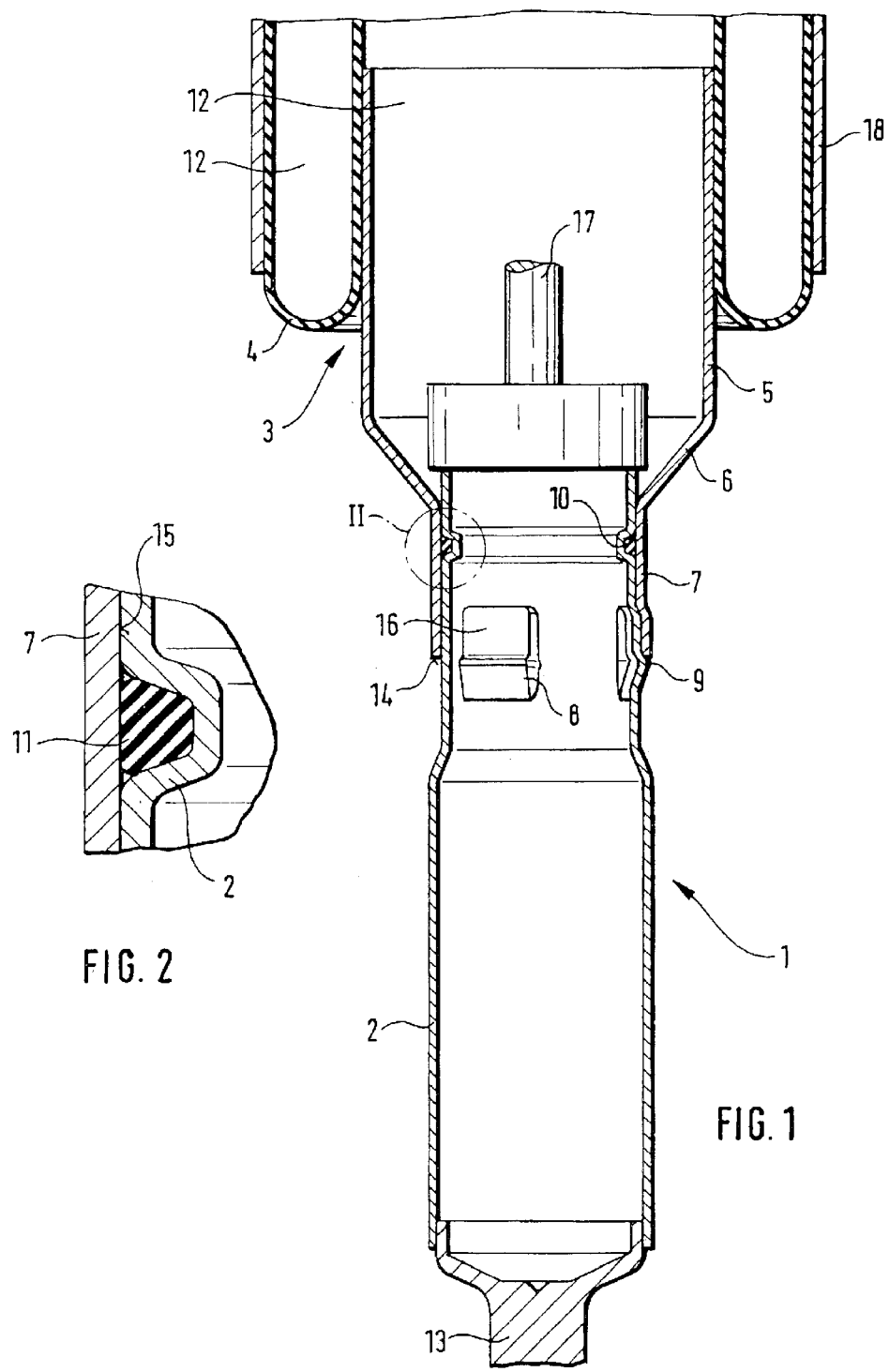
FIG. 1 is a cross-section which shows a shock absorber with axial fixing of a front end of a rolling tube with respect to indentations on a container tube, and also sealing the tubes with respect to each other by means of an O ring.
FIG. 2 is an enlarged cross-section which shows the O ring in its groove between the rolling tube and the container tube in an enlarged illustration.

A shock absorber according to the present invention is illustrated in FIG. 1 and comprises a damping element 1 and an air spring 3, the damping element 1 having a container tube 2, a fixing component 13 and a piston rod 17 and the air spring 3 comprising a spring bellows 4 acting as a rolling bellows, a gas chamber 12 under pressure prestress, an outer tube 18 connected to a mass to be held with low oscillations, and a rolling tube 5 bearing a rolling profile 6. The spring bellows 4, as a resilient element, connects the outer tube 18 and the rolling tube 5, the spring bellows 4 rolling on the rolling profile 6 of the rolling tube 5 during axial relative movement of the outer tube 18 with respect to the rolling tube 5 and, as a result of the compression of the gas, performing the function of a spring. In the present exemplary embodiment, the rolling tube 5 tapers to form a cylindrical tube end 7 which, as compared with the outer diameter of the container tube 2, has an inner diameter 15 which is only insignificantly larger. i.e. substantially the same as, than the outer diameter of the container tube 2, as can be seen from FIG. 2. The gap remaining therein is sealed off by an O ring 11, which is arranged in a groove 10 formed in the container tube 2. The gas chamber 12 of the air spring 3, sealed off in this way, has the effect that the rolling tube 5 has to be secured axially with respect to the container tube 2 of the damping element 1 in the direction pointing away from the air spring 3. For this purpose, the container tube 2 is formed with at least one radial projection 8, which the rolling tube 5 strikes with a constriction or with its front end 14. The projections 8 are preferably provided with a shoulder 9 and possibly also with a contact surface 16, against which the rolling tube 5 is pressed by the pressure in the air spring 3. The tube 5 has a conically expanded portion at the axial end 14, which facilitates fitting it over the O ring 11 during assembly.

The advantage of the subject of the invention as compared with the prior art resides in the fact that the assembly of the rolling tube 5 on the container tube 2 and the associated sealing by means of the O ring 11 are achieved simply in a cost-effective manner by pushing them together, the position of the tubes 2, 5 in relation to each other resulting automatically as a result of the projections.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A shock absorber comprising:
   a damping element having a container tube formed with a circumferential groove and at least one radially outward extending projection which is axially spaced from said circumferential groove;
   an air spring comprising a rolling tube and a concentrically arranged outer tube which is connected to said rolling tube by a bellows so that said rolling tube can move axially with respect to said outer tube, said bellows and said rolling tube bounding a gas chamber filled with a gas under pressure which exerts an axial force on said rolling tube, said rolling tube being received concentrically on said container tube over said groove and being urged against said at least one radially outward extending projection by said axial force; and
   an O ring which is received in said circumferential groove and seals off said container tube with respect to said rolling tube.

2. A shock absorber as in claim 1 wherein said rolling tube has an axial end which is received against said at least one projection.

3. A shock absorber as in claim 2 wherein said rolling tube has a conically expanded portion at said axial end.

4. A shock absorber as in claim 3 wherein the at least one radially outward extending projection comprises a plurality of projections and said projections each have a contact surface which centers said conically expanded portion.

5. A shock absorber as in claim 2 wherein the at least one radially outward extending projection comprises a plurality of projections and each of said projections has an axially facing shoulder which extends circumferentially, said axial end abutting said axially facing shoulders.

6. A shock absorber as in claim 1 wherein said container tube has an outer diameter and said rolling tube has a cylindrical tube end with an inner diameter which is substantially the same as the outer diameter of the container tube.

* * * * *